June 6, 1967 J. V. J. CORNEY 3,324,405
D.C. RESTORATION IN AMPLIFIERS
Filed Oct. 1, 1964
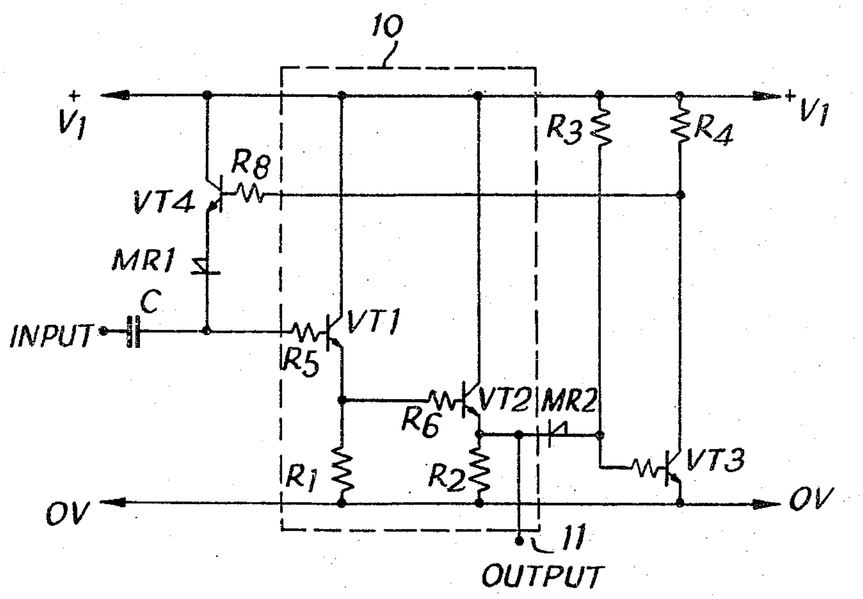
INVENTOR
JOHN VICTOR JAMES CORNEY
BY
Robert E. Strauss
ATTORNEY United States Patent Office 3,324,405

Patented June 6, 1967

3,324,405

D.C. RESTORATION IN AMPLIFIERS

John Victor James Corney, London, England, assignor to Ferguson Radio Corporation Limited, London, England Filed Oct. 1, 1964, Ser. No. 400,742
Claims priority, application Great Britain, Oct. 21, 1963, 41,538/63
5 Claims. (Cl. 330—11)

The present invention relates to amplifiers and is concerned with the problem of ensuring that the D.C. level of an amplified signal is correct at the output of the amplifier. The invention is moreover concerned particularly but not exclusively with the amplification of a particular type of signal, hereinafter referred to as of the type specified, which includes regularly recurrent pulses whose tips represent the maximum excursion of the signal and are required to lie at a predetermined D.C. level at the output of the amplifier. A common example of such a signal is a television signal in which the pulses are synchronising pulses.

D.C. levels in television equipment are commonly preserved, where necessary, by means of conventional D.C. restoring circuits in conjunction with A.C. coupled amplifiers.

When the television signal has an amplitude of 1 v. D.A.P. or less, difficulty is experienced with a conventional D.C. restoring circuit, which will not work efficiently at such low levels. The difficulty is particularly great if the diode D.C. restoring circuit feeds a transistor rather than a thermionic valve because the restoration must in general, be performed at a relatively low impedance level. For a given diode forward impedance, the restoration efficiency is therefore less with a transistor than with a thermionic valve.

An amplifier of the above mentioned type is described and claimed in our British patent specification No. 923,173.

An object of the invention is to provide a simple, stable system which is more effective at low input levels, with synchronizing pulses of below 1 volt peak to peak, than is possible with conventional diode D.C. restoration circuits.

In the British patent specification No. 923,173 the tips of the pulses of the amplifier output signal are detected, the voltage provided by the detector is compared with a reference voltage and the D.C. bias applied to the input stage of the amplifier is varied to an extent dependent on the magnitude of any difference between the said voltages and in such a sense as to tend to decrease the said difference.

According to the present invention however, there is provided an electrical assembly comprising a D.C. amplifier having an output stage coupled to a detector adapted to detect the tips of excursions exceeding a predetermined level in one sense of a signal undergoing amplification, and a feedback path, between the amplifier output and its input, which is brought into operation by the detector, only during detection of the tip of an excursion, and the amplifier in conjunction with the feedback path having a quiescent state yielding a predetermined output voltage, so that when the feedback path is operative the detected tips feed charge to or take charge from a capacitor in the amplifier input circuit and so bring the input to the amplifier substantially to its quiescent level and the amplifier output level is stabilized at the predetermined voltage.

Thus instead of the detected tips being used to control a D.C. bias level and so indirectly adjust the D.C. level, the detected tips act by way of the feedback path themselves to adjust the D.C. level by charging or discharging the capacitor. The effect is the same but the circuit is simplified.

If the signal is of the type specified the excursions whose tips are detected will be the said regularly recurrent pulse whose tips will then be stabilized as required. However, an oscillatory signal other than of the type specified may be fed through the ampifier (without making any circuit modifications) and then a degree of rectification will take place. This will result from stabilization of the tips of half cycles of the signal of one sense at the predetermined voltage. This may be advantageous in obtaining a signal detector with a greater range of linear response, operating at frequencies up to a few megacycles per second, down to perhaps 0.1 volt peak to peak sinusoidal input.

The invention will now be described, by way of example only, with reference to the accompanying drawing which shows the circuit diagram of an embodiment of the invention.

The connection of the components of the circuit will not be described as this is shown clearly in the drawing.

In the drawing an amplifier 10 receives its input through a capacitor C and its output appears at a terminal 11. The amplifier which is of low voltage gain has a relatively high impedance input at the base of a transistor VT1 and a low impedance output at the emitter of a transistor VT2. A feedback path exists, through a diode MR2, transistors VT3 and VT4, and another diode MR1 from the amplifier output to its input.

In the quiescent state of the circuit in the drawing the transistor VT3 conducts without being bottomed because the diode MR2 and a resistor R2 shunt the base-emitter junction of the transistor VT3. Thus the collector voltage of the transistor VT3 is applied through the transistors VT4 and VT1, and the diode MR1 to the base of the transistor VT2. In the quiescent state the voltage of the emitter of transistor VT2 allows a substantial current to flow through the diode MR2 and the resistor R2 and thus prevents the transistor VT3 from bottoming.

The collector voltage of the transistor VT3 exceeds the emitter voltage of the transistor VT2 by the sum of the base to emitter voltages of the transistors VT4, VT1 and VT2 and the forward drop of the diode MR1.

If the output voltage at terminal 11 falls, the transistor VT3 conducts less since its base voltage falls. The voltage across a resistor R4 is reduced and the conduction of the transistor VT4 increases and therefore the output current of the transistor VT1 increases and the output voltage of the amplifier rises. Similarly if the output potential rises, the collector voltage of the transistor VT3 falls and offsets the rise in output voltage.

The feedback path therefore tends to stabilize the quiescent output voltage of the amplifier at or near zero volts, the transistor VT3 providing the forward gain and the necessary inversion of sign.

In operation, a video signal, with "white" as the positive going polarity, is applied through the capacitor C to the input of the amplifier.

If the input signal is positive the emitter of the transistor VT2 becomes positive and reverse biasses the diode MR2 thus preventing conduction through the base-emitter shunt path of the transistor VT3 and therefore allowing this transistor to bottom. The fall of the collector voltage of the transistor VT3 cuts-off the transistor VT4 and reverse biasses the diode RM1. The sole function of this diode is to prevent excessive reverse bias on the base-emitter junction of the transistor VT4, which in this embodiment is a graded-base transistor.

When a negative going synchronising pulse is applied at the amplifier input, the emitter of the transistor VT2 becomes more negative and forward biasses the diode MR2.

The inverted and amplified tip of the synchronizing pulse appears at the collector of the transistor VT3, where it is passed to the transistor VT4 and so in conjunction with the synchronising pulse at the capacitor C, forward biasses the diode MR1 and the base emitter junction of the transistor VT4. The combined biassing potential across the diode and transistor results in better conduction at low signal levels than would otherwise be obtained. Conduction through the diode MR1 charges the capacitor C to a voltage such that the synchronizing pulses bring the system substantially to its quiescent condition and the tips of the synchronizing pulses are stabilized at the quiescent emitter voltage of the transistor VT2 which is at or near zero volts.

If however the voltage on the capacitor C is already too high to allow the pulse tips to be stabilized at zero volts, then charge leaks away through the base of the transistor VT1. If necessary a shunt resistor from the base of this transistor to the OV rail may be included.

Resistors R5 to R8 are of low value, for example 47 ohms and are attached to the bases of the transistors by short leads. Their function is to prevent the generation of spurious oscillations by the transistors, which have a high gain times bandwidth product in the same way as the "stopper" resistors used with high slope thermionic valves prevent the oscillation of these valves.

The above embodiment of the invention stabilizes the tips of the synchronizing pulses or, in other words, D.C. restores the signal, when the peak to peak voltage of the synchronizing pulses in the input or output signal is about 0.1 volt and there is no significant change in the output level of the tips of the synchronizing pulses when the signal changes from black raster conditions (0.1 volt peak to peak synchronizing pulse only) to white raster conditions (0.1 volt peak to peak synchronizing pulse plus 0.3 volt peak to peak luminance, that is 0.4 volt peak to peak video). The tip of a 0.1 volt peak to peak synchronizing pulse is also stabilized during broad field pulses when the video signal is constantly changing.

Other amplifiers for instance those shown in FIGS. 3 and 4 of the British patent specification No. 923,173 may be adapted and used with the feedback control method described.

Transistors of the PNP type may be used instead of the NPN transistors shown in the diagram if the supply polarity and the sense of the connections of the diodes between the relevant emitters and bases are each reversed. Such a circuit would be useful for instance if the input signal were of the opposite polarity to the normal positive-going white polarity.

What is claimed is:

1. D.C. restoration circuitry comprising in combination:
 a D.C. amplifier having input and output stages;
 means including a capacitor coupling an input signal to said input stage; and feedback means for coupling a signal from said output stage to said input stage, said feedback means including:
  means coupled to said output stage for detecting signals which exceed a predetermined magnitude in one sense,
  means for inverting and amplifying said detected signal which exceeds said predetermined magnitude in one sense,
  control means coupling said signal detection means to said inversion and amplification means and to a voltage source, said control means establishing said predetermined magnitude above which said signals are detected, and
  impedance transforming and series connected protective means coupling said inverting and amplifying means to the junction of said capacitor and said input stage, said means being in the form of a series connected transistor and diode whereby detected signals exceeding said predetermined magnitude are applied to said input stage to stabilize the voltage at said output stage.

2. The D.C. restoration circuitry of claim 1 wherein said signal detecting means of said feedback means is in the form of a diode detector.

3. The D.C. restoration circuitry of claim 1 wherein said signal inverting and amplifying means of said feedback means is in the form of a transistor having base, emitter, and collector electrodes, said base being connected to said control means, said emitter connected to circuit ground, and said collector coupled via a load resistor to a voltage source and to said impedance transforming and protective means.

4. The D.C. restoration circuitry of claim 1 wherein said control means of said feedback means includes a first and second resistor series connected intermediate a voltage source and said inverting and amplifying means, said resistors having a junction therebetween connected to said signal detecting means.

5. The D.C. restoration circuitry of claim 1 wherein said transistor of said impedance transforming and protective means in said feedback means includes base, collector, and emitter electrodes, said base being coupled to said inverting and amplifying means, said collector being connected to a voltage source, and said emitter coupled to said input stage via said diode protective means.

References Cited

FOREIGN PATENTS

| | | |
|---|---|---|
| 920,053 | 3/1963 | Great Britain. |
| 923,173 | 4/1963 | Great Britain. |

ROY LAKE, *Primary Examiner.*

J. B. MULLINS, *Assistant Examiner.*